(12) United States Patent
Smelyansky

(10) Patent No.: US 11,601,547 B2
(45) Date of Patent: Mar. 7, 2023

(54) ROBOCALL SCREENING

(71) Applicant: XCAST LABS, INC., Northfield, IL (US)

(72) Inventor: Vladimir Smelyansky, Glenview, IL (US)

(73) Assignee: RESTOREN PARTNERS, West Palm Beach, FL (US)

( * ) Notice: Subject to any disclaimer, the term of this patent is extended or adjusted under 35 U.S.C. 154(b) by 0 days.

(21) Appl. No.: 16/940,804

(22) Filed: Jul. 28, 2020

(65) Prior Publication Data

US 2021/0037133 A1    Feb. 4, 2021

Related U.S. Application Data

(60) Provisional application No. 62/879,681, filed on Jul. 29, 2019.

(51) Int. Cl.
*H04M 3/42*    (2006.01)
*H04W 4/16*    (2009.01)

(52) U.S. Cl.
CPC ......... *H04M 3/42059* (2013.01); *H04W 4/16* (2013.01)

(58) Field of Classification Search
CPC ..... H04M 3/42059; H04M 2203/6072; H04M 3/4365; H04M 2203/2027; H04W 4/16
See application file for complete search history.

(56) References Cited

U.S. PATENT DOCUMENTS

| | | | |
|---|---|---|---|
| 9,014,359 B1* | 4/2015 | Pfeffer | H04M 3/4365 |
| | | | 379/88.19 |
| 9,078,113 B1* | 7/2015 | Brown | H04W 4/12 |
| 9,277,049 B1* | 3/2016 | Danis | H04M 3/54 |
| 9,332,119 B1* | 5/2016 | Danis | H04M 3/42042 |
| 10,523,814 B1* | 12/2019 | Moore | H04M 3/436 |
| 2016/0036991 A1* | 2/2016 | Brewer | H04M 3/42314 |
| | | | 370/356 |
| 2016/0316057 A1* | 10/2016 | Korn | H04M 3/4936 |
| 2019/0394333 A1* | 12/2019 | Jiron | G06F 21/32 |

* cited by examiner

*Primary Examiner* — Minjung Kim
(74) *Attorney, Agent, or Firm* — Smith, Gambrell & Russell, LLP

(57) ABSTRACT

Embodiments may provide techniques to screen for, detect, and prevent connection of robocalls. For example, in an embodiment, a method, implemented in a computer system comprising a processor, memory accessible by the processor, and computer program instructions stored in the memory and executable by the processor, may comprise receiving, at a telecommunications switch, a request to initiate a call from an originating party, selecting, at the telecommunications switch, from a list of terminating carrier networks, a media server, routing, at the telecommunications switch, the request to initiate the call to the media server, forwarding, from the media server, a media prompt requesting the originating party to enter a response to the media prompt, and when the originating party does not enter a correct response to the media prompt, forwarding, from the media server, an indication that the call is forbidden.

27 Claims, 3 Drawing Sheets

ROBOCALL SCREENING

CROSS-REFERENCE TO RELATED APPLICATIONS

This application claims the benefit of U.S. Provisional App. No. 62/879,681, filed Jul. 29, 2019, the contents of which are incorporated herein in their entirety.

BACKGROUND

The present invention relates to techniques to screen for, detect, and prevent connection of robocalls.

Robocalls are a phone calls that are initiated using computer hardware and software, such as a computerized autodialer and a voice recording and/or response system to deliver a pre-recorded message. The volume of robocalls has been increasing and is currently in the billions of calls per month. In addition to the annoyance and inconvenience of receiving robocalls, many such calls are attempts to scam or defraud the call recipients.

Accordingly, a need arises for techniques to screen for, detect, and prevent connection of robocalls.

SUMMARY

Embodiments may provide techniques to screen for, detect, and prevent connection of robocalls.

For example, in an embodiment, a method, implemented in a computer system comprising a processor, memory accessible by the processor, and computer program instructions stored in the memory and executable by the processor, may comprise receiving, at a telecommunications switch, a request to initiate a call from an originating party, selecting, at the telecommunications switch, from a list of terminating carrier networks, a media server, routing, at the telecommunications switch, the request to initiate the call to the media server, forwarding, from the media server, a media prompt requesting the originating party to enter a response to the media prompt, and when the originating party does not enter a correct response to the media prompt, forwarding, from the media server, an indication that the call is forbidden.

In embodiments, the method may further comprise when the originating party enters a correct response to the media prompt, forwarding, from the media server, an indication that the media server is unavailable to complete the call, selecting, at the telecommunications switch, from the list of terminating carrier networks, a terminating carrier network to complete the call, and routing, at the telecommunications switch, the request to initiate the call to the selected terminating carrier network. Not entering a correct response may comprise entering an incorrect response and not entering any response within a defined timeout. The requested response may comprise entering at least one digit. Not entering a correct response may comprise at least one of entering at least one incorrect digit, entering an incorrect number of digits, entering an incorrect sequence of digits, and not entering any digit within a defined timeout. The method may further comprise analyzing, at the media server, information relating to the requested call, and forwarding, from the media server, an indication that the call is forbidden even when the originating party does not enter a correct response to the media prompt.

In an embodiment, a telecommunications switch may comprise a processor, memory accessible by the processor, and computer program instructions stored in the memory and executable by the processor to perform receiving, at the telecommunications switch, a request to initiate a call from an originating party, selecting, at the telecommunications switch, from a list of terminating carrier networks, a media server, routing, at the telecommunications switch, the request to initiate the call to the media server, forwarding, from the media server, a media prompt requesting the originating party to enter a response to the media prompt, and when the originating party does not enter a correct response to the media prompt, forwarding, from the media server, an indication that the call is forbidden.

In an embodiment, a computer program product may comprise a non-transitory computer readable storage having program instructions embodied therewith, the program instructions executable by a computer, to cause the computer to perform a method comprising receiving, at a telecommunications switch, a request to initiate a call from an originating party, selecting, at the telecommunications switch, from a list of terminating carrier networks, a media server, routing, at the telecommunications switch, the request to initiate the call to the media server, forwarding, from the media server, a media prompt requesting the originating party to enter a response to the media prompt, and when the originating party does not enter a correct response to the media prompt, forwarding, from the media server, an indication that the call is forbidden.

In an embodiment, a method may be implemented in a computer system comprising a processor, memory accessible by the processor, and computer program instructions stored in the memory and executable by the processor, the method may comprise receiving, at a telecommunications switch, a request to initiate a call from an originating party, selecting, at the telecommunications switch, from a list of terminating carrier networks, an evaluation service, routing, at the telecommunications switch, the request to initiate the call to the evaluation service, analyzing, at the evaluation service, a media dialog from the originating party to determine whether to allow the call, and when the evaluation service determines not to allow the call, forwarding, from the evaluation service, an indication that the call is forbidden.

In embodiments, the method may further comprise when the evaluation service determines to allow the call, forwarding, from the evaluation service, an indication that the evaluation service is unavailable to complete the call, selecting, at the telecommunications switch, from the list of terminating carrier networks, a terminating carrier network to complete the call, and routing, at the telecommunications switch, the request to initiate the call to the selected terminating carrier network. The evaluation service may analyze the media dialog using voice recognition to determine a content of the media dialog and artificial intelligence to determine whether the call is unwanted or illegal based on the determined content.

In an embodiment, a telecommunications switch may comprise a processor, memory accessible by the processor, and computer program instructions stored in the memory and executable by the processor to perform receiving, at a telecommunications switch, a request to initiate a call from an originating party, selecting, at the telecommunications switch, from a list of terminating carrier networks, an evaluation service, routing, at the telecommunications switch, the request to initiate the call to the evaluation service, analyzing, at the evaluation service, a media dialog from the originating party to determine whether to allow the call, and when the evaluation service determines not to allow the call, forwarding, from the evaluation service, an indication that the call is forbidden.

In an embodiment, a computer program product may comprise a non-transitory computer readable storage having program instructions embodied therewith, the program instructions executable by a computer, to cause the computer to perform a method comprising receiving, at a telecommunications switch, a request to initiate a call from an originating party, selecting, at the telecommunications switch, from a list of terminating carrier networks, an evaluation service, routing, at the telecommunications switch, the request to initiate the call to the evaluation service, analyzing, at the evaluation service, a media dialog from the originating party to determine whether to allow the call, and when the evaluation service determines not to allow the call, forwarding, from the evaluation service, an indication that the call is forbidden.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments may provide techniques to screen for, detect, and prevent connection of robocalls.

Embodiments of the present techniques may provide to capability to techniques to screen for, detect, and prevent connection of robocalls. Embodiments may utilize existing telephone network components to provide such capabilities. The proposal assumes that all calls on the trunk group have to be screened. For example, embodiments may use a combination of redundant and load balanced soft switches and evaluation services to create a call screening solution for calls being passed to terminating carriers. In embodiments, an evaluation service may be inserted into appropriate service classes (dialing plans) with the highest priority, making it always a first destination for an outgoing call. The evaluation service may then be used for playing instruction prompts to the caller and for collecting and recognizing digits dialed in response to such instructions. Embodiments may utilize communications based on, for example, SIP, RTP, and RTP Payload for DTMF Digits, Telephony Tones and Telephony Signals protocol standards.

Figure 1A:
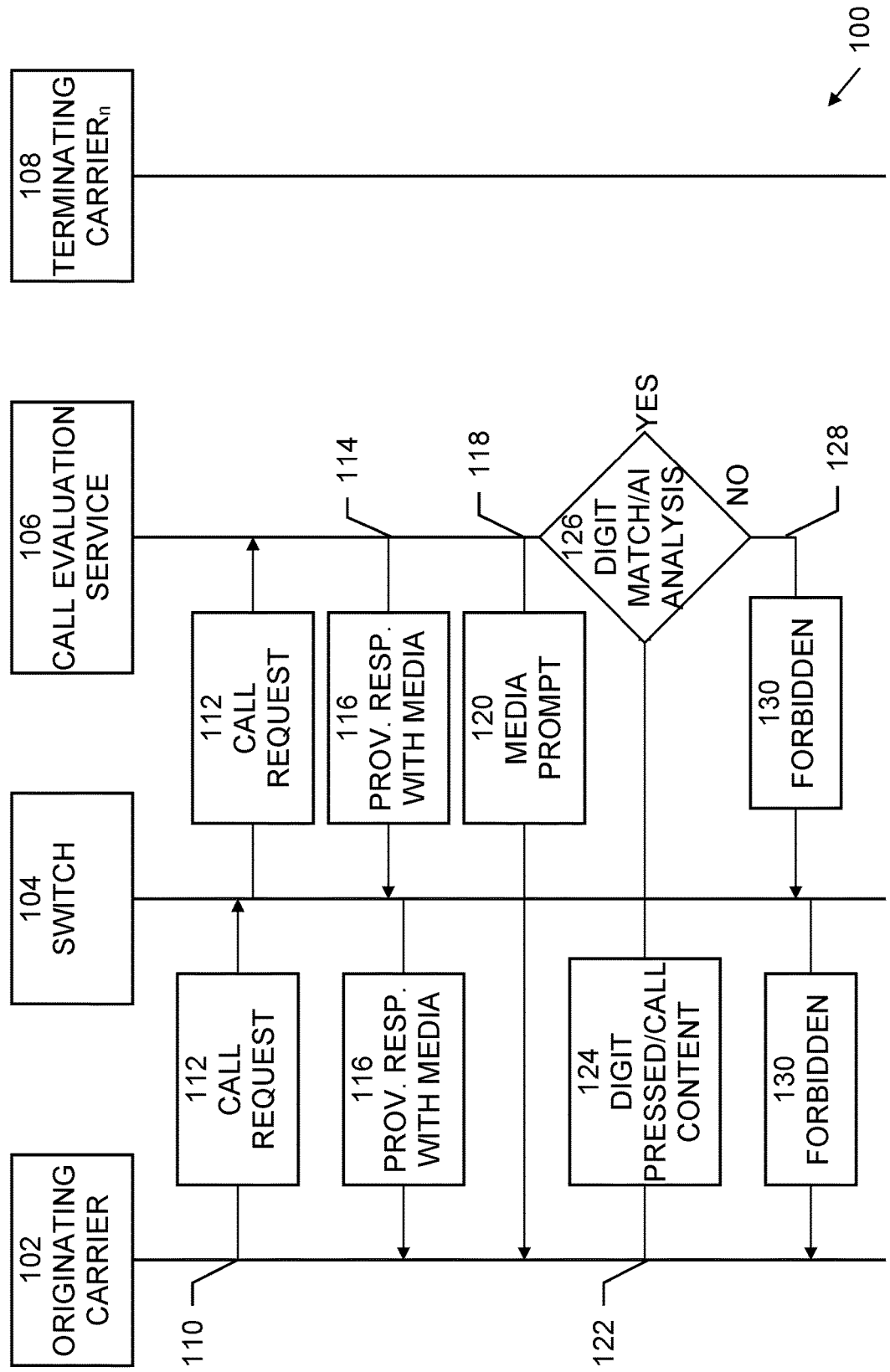
FIG. 1a illustrates a portion of exemplary process of detecting and handling a robocall.

A portion of exemplary process 100 of detecting and handling a robocall is shown in FIG. 1a. As shown in the example of FIG. 1a, process 100 may utilize components such as originating carrier network 102, switch 104, evaluation service 106, and terminating carrier network 108. Originating carrier network 102 and terminating carrier network 108 may be telecommunications networks operated by or for telecommunications carriers. Switch 104 may be a call switching node in a telecommunications network, which connects telephone calls between users and/or other switching systems. In embodiments, switch 104 may be a hardware-based switch, a software-based switch (softswitch), or a hybrid switch, which may be a combination of the two. A softswitch may be a switch that is based not on the specialized switching hardware of the traditional telephone exchange, but may be implemented in software running on a computing platform. Typically, a softswitch may be implemented to switch calls using voice over IP (VoIP) technologies, but some softswitches may also switch non-VoIP or Public Switched Telephone Network (PSTN) calls. Evaluation service 106 may be a computer system or a software application that stores digital media, such as video, audio or images, and makes it available over a network. Evaluation services may also provide interactive functions with media content, such as voice recognition, DTMF recognition, interactive voice response (IVR), etc. Evaluation service 106 may be implemented in any of a number of ways. For example, evaluation service 106 may be implemented in a dedicated or shared media or other server in the same network as switch 104, or on the same hardware as switch 104, evaluation service 106 may be implemented as remote service on a dedicated or shared media or other server, evaluation service 106 may be implemented as a cloud service, etc.

Process 100 may provide the capability to force a caller to enter a simple IVR interaction session before completing the call. All calls may be sent to switch 104 and processed based on the account policy. After that, calls designated for screening may be directed to evaluation service 106 first. Evaluation service 106 may respond using, for example, a SIP provisional response with media. This allows playing an audio prompt to an originating party without going off hook. It is to be noted that the messages referred to in the discussion of process 100 may be SIP messages. However, the present techniques are applicable to any protocol standards, for example, SIP, RTP, and RTP Payload for DTMF Digits, Telephony Tones and Telephony Signals protocol standards.

Process 100 may begin with 110, in which an originating party may initiate a call with originating carrier network 102. Accordingly, originating carrier network 102 may transmit call request 112 to switch 104. Switch 104 may select a carrier network to which call request 112 is to be transmitted in accordance with an account policy for the originating party. The account policy may include a carrier list, which may provide identification of carrier networks to which call request 112 may be transmitted, and an order of carrier networks to which call request 112 may be transmitted. In embodiments, evaluation service 106 may be included in the carrier list as the first or highest priority carrier network to which call request 112 may be transmitted, while actual carrier networks, such as terminating carrier network 108, may be listed as alternative or lower-priority carrier networks to which call request 112 may be transmitted. Accordingly, switch 104 may select evaluation service 106 as the carrier network to which call request 112 may be transmitted first, and may transmit call request 112 to evaluation service 106. Call request 112 may be, for example, standard call request messages, such as may be defined by the SIP standard, or other standards.

At 114, in response to receiving call request 112, evaluation service 106 may transmit a provisional response with media message 116 to switch 104, which may transmit provisional response with media message 116 to originating carrier network 102. Provisional response with media message 116 may be, for example, a standard SIP message. Along with the provisional response with media message, at 118, evaluation service 106 may generate and transmit media including media prompt 120 to originating carrier network 102, which may play media prompt 118 to the originating party. Media prompt 120 may include an audio message prompting the originating party to enter a particular response, such as to press a specific digit or a plurality or sequence of digits from the range of 0-9. At 122, the originating party may enter a response 124, which may be transmitted to evaluation service 106. At 126, evaluation service 106 may determine if response 124 is correct, that is, if response 124 meets the requirements of the prompted response. If the originating party does not enter a correct response, such as entering a wrong digit, entering an incorrect number of digits, an incorrect sequence of digits, or entering no response within a defined timeout (for example, five seconds), 118-126 may be repeated to request the originating party to reenter the response, such as the same digit or plurality or sequence of digits. If, after a defined number of attempts, the originating party has not entered a correct response, then at 128, evaluation service 106 may transmit Forbidden message 130, such as a SIP Forbidden message to switch 104, which in turn will transmit Forbidden message 130 to originating carrier network 102. Due to the current functionality of computerized calling systems, with robocalls, it is likely that either no response or the wrong response will be produced, and a Forbidden message 130 will be returned to originating carrier network 102. At this point originating carrier network 102 may take appropriate action, such as to either terminate or reroute the call and play an error message or tone(s) to the originating party.

Figure 1B:
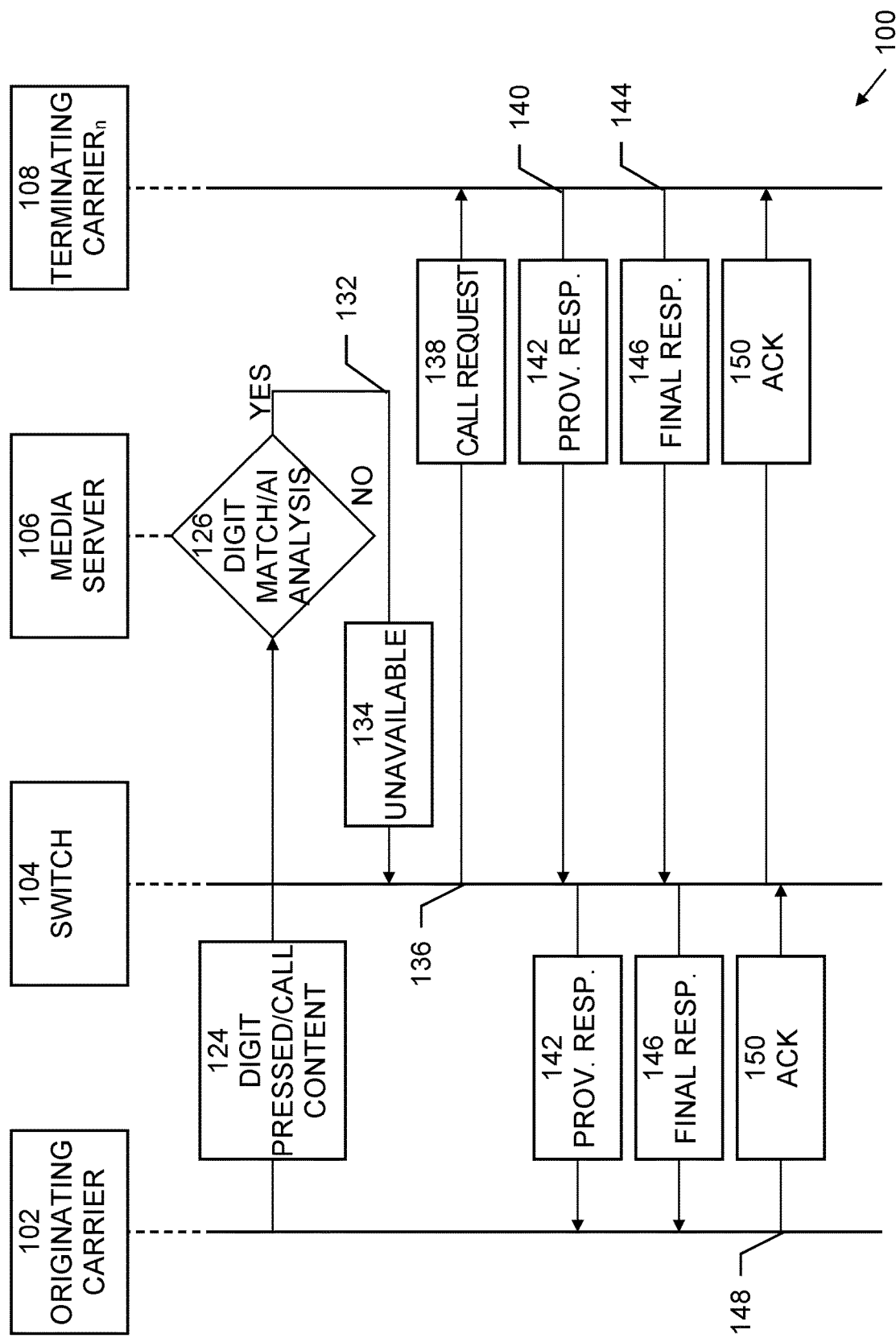
FIG. 1b illustrates a portion of exemplary process of detecting and handling a robocall.

A remaining portion of process 100 is shown in FIG. 1b. Process 100 proceeds as shown in FIG. 1a. At 126, evaluation service 106 may determine if response 124 is correct, that is, if response 124 meets the requirements of the prompted response. If a call is made by a human being, the assumption is that the originating party will be able to follow simple instructions played in a short audio prompt and perform the correct response, such as press the right digit or plurality or sequence of digits, which will be properly recognized by the evaluation service. Accordingly, at 126, if response 124 meets the requirements of the prompted response, process 100 may continue with 132, in which an unavailable message 134 may be transmitted to switch 104, indicating that the first selected carrier network is unavailable. Upon receipt of unavailable message 134, switch 104 may be forced to attempt to have the call completed by a next carrier on the carrier list, and may select another carrier from the list, such as terminating carrier network 108. Accordingly, at 136, switch 104 may transmit call request 138 to terminating carrier network 108, which may process the call and complete the call normally as follows: In response to call request 138, at 140, terminating carrier network 108 may transmit provisional response message 142 to switch 104, which may transmit or forward provisional response message 142 to originating carrier network 102. At 144, terminating carrier network 108 may transmit final response message 146 to switch 104, which may transmit or forward final response message 146 to originating carrier network 102. At 148, originating carrier network 102 may transmit Acknowledgment 150 to switch 104, which may transmit or forward Acknowledgment 150 to terminating carrier network 108.

In embodiments, a relatively simple dialog/response model may be used, such as requesting one digit, a plurality of digits, a sequence of digits, etc. However, in embodiments, a more sophisticated dialog/response model may be used to identify and distinguish unwanted, illegal and important robocalls. For example, an important robocall could be an emergency notification, such as that school is closed, or a reminder about doctor appointment. Such a more sophisticated dialog/response model may be implemented using an Artificial Intelligence Subsystem (AI), for example, deployed in evaluation service 106 or communicatively connected to evaluation service 106. In embodiments, the AI may analyze 126 information relating to the call, such as the caller ID of the incoming call, the content of the robocall audio 124, as determined using voice recognition, and other data relating to the call. Calls identified by the AI as unwanted/illegal calls may be processed as in FIG. 1a, resulting in a Forbidden message 130 being returned to originating carrier network 102. Calls identified by the AI as wanted/important calls may be processed as in FIG. 1b, resulting in a Unavailable message 134 being returned to switch 104, and subsequent processing to connect the call as shown in FIG. 1b.

Figure 2:
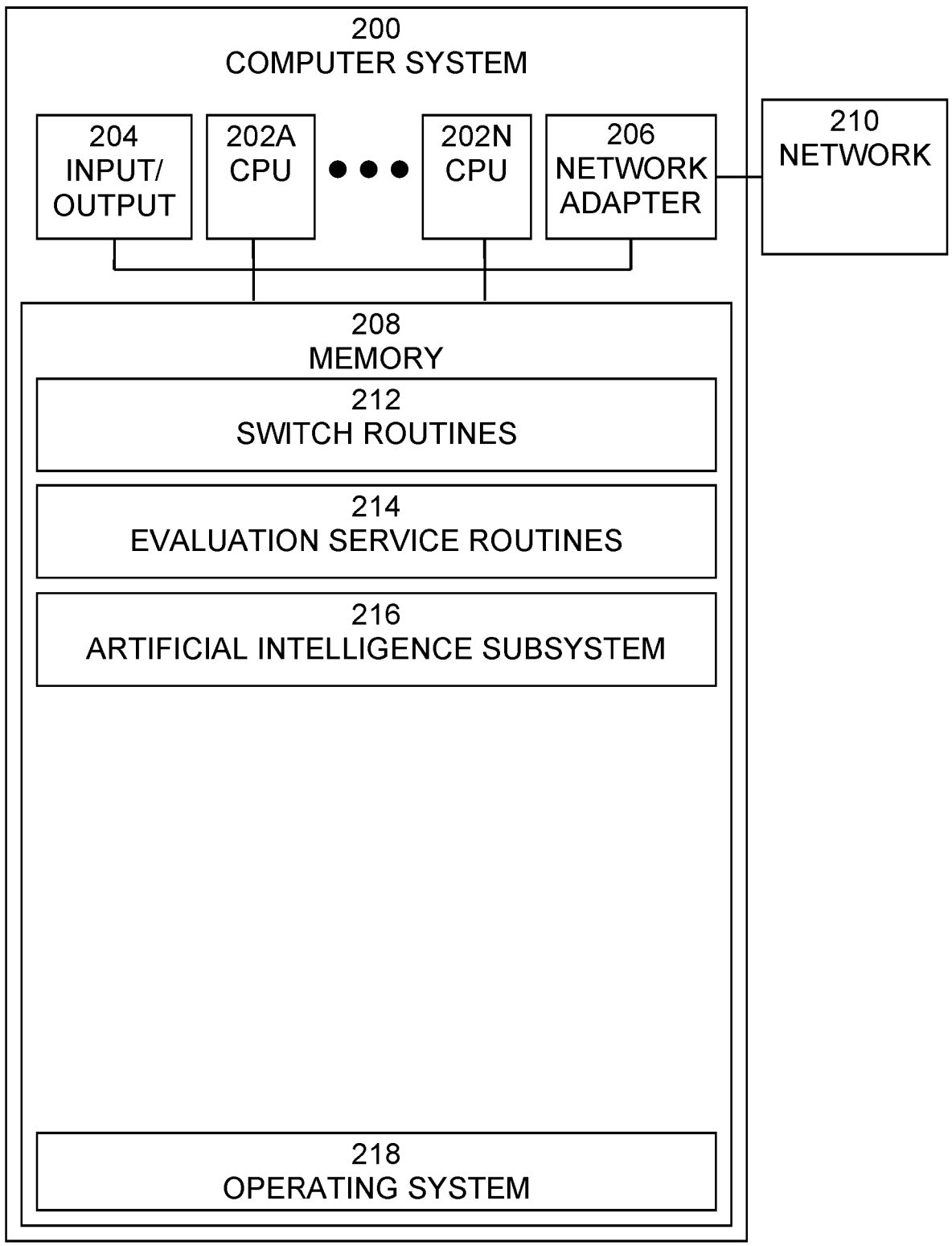
FIG. 2 is an exemplary block diagram of a computer system, in which processes involved in the embodiments described herein may be implemented.

An exemplary block diagram of a computer system 200, in which processes involved in the embodiments described herein may be implemented, is shown in FIG. 2. Computer system 200 may be implemented using one or more programmed general-purpose computer systems, such as embedded processors, systems on a chip, personal computers, workstations, server systems, and minicomputers or mainframe computers, or in distributed, networked computing environments. Computer system 200 may include one or more processors (CPUs) 202A-202N, input/output circuitry 204, network adapter 206, and memory 208. CPUs 202A-202N execute program instructions in order to carry out the functions of the present communications systems and methods. Typically, CPUs 202A-202N are one or more microprocessors, such as an INTEL CORE® processor. FIG. 2 illustrates an embodiment in which computer system 200 is implemented as a single multi-processor computer system, in which multiple processors 202A-202N share system resources, such as memory 208, input/output circuitry 204, and network adapter 206. However, the present communications systems and methods also include embodiments in which computer system 200 is implemented as a plurality of networked computer systems, which may be single-processor computer systems, multi-processor computer systems, or a mix thereof.

Input/output circuitry 204 provides the capability to input data to, or output data from, computer system 200. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 206 interfaces device 200 with a network 210. Network 210 may be any public or proprietary LAN or WAN, including, but not limited to the Internet.

Memory 208 stores program instructions that are executed by, and data that are used and processed by, CPU 202 to perform the functions of computer system 200. Memory 208 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 208 may vary depending upon the function that computer system 200 is programmed to perform. In the example shown in FIG. 2, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 2, memory 208 may include switch routines 212, evaluation service routines 214, Artificial Intelligence Subsystem (AI) 216, and operating system 218. In this example, switch routines 212, evaluation service routines 214, and Artificial Intelligence Subsystem (AI) 216 are all shown as being included in one computer system 200. However, these software components may be arranged, distributed, and be communicatively connected in any configuration among any number of computer systems, based on well-known engineering considerations. Switch routines 212 may include software routines to implement the functionality of switch 104, shown in FIGS. 1a and 1b, as described above. Evaluation service routines 214 may include software routines to implement the functionality of evaluation service 106, shown in FIGS. 1a and 1b, as described above. Artificial Intelligence Subsystem (AI) 216 may include software routines to implement the functionality of and AI subsystem, as described above. Operating system 218 may provide overall system functionality.

As shown in FIG. 2, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method, implemented in a computer system comprising a processor, memory accessible by the processor, and computer program instructions stored in the memory and executable by the processor, the method comprising: receiving, at a telecommunications switch, a request to initiate a call from an originating party; selecting, at the telecommunications switch, from a list of terminating carrier networks, an evaluation service based on priority; wherein the evaluation service is included in the list of terminating carrier with highest priority and a terminating carrier with which the call is completed is included in the list of terminating carrier as a lower priority; routing, at the telecommunications switch, the request to initiate the call to the evaluation service; forwarding, from the evaluation service, a media prompt requesting the originating party to enter a response to the media prompt; and when the originating party does not enter a correct response to the media prompt, forwarding, from the evaluation service, an indication that the call is forbidden, and blocking the call, at the telecommunications switch, based on the incorrect response to the media prompt.

2. The method of claim 1, further comprising: when the originating party enters a correct response to the media prompt, forwarding, from the evaluation service, an indication that the evaluation service is unavailable to complete the call; selecting, at the telecommunications switch, from the list of terminating carrier networks, a terminating carrier network to complete the call; and routing, at the telecommunications switch, the request to initiate the call to the selected terminating carrier network.

3. The method of claim 2, wherein not entering a correct response comprises entering an incorrect response and not entering any response within a defined timeout.

4. The method of claim 2, wherein the requested response comprises entering at least one digit.

5. The method of claim 4, wherein not entering a correct response comprises at least one of entering at least one incorrect digit, entering an incorrect number of digits, entering an incorrect sequence of digits, and not entering any digit within a defined timeout.

6. The method of claim 1, further comprising: analyzing, at the evaluation service, information relating to the requested call, and forwarding, from the evaluation service, an indication that the call is forbidden even when the originating party does not enter a correct response to the media prompt.

7. A telecommunications switch comprising a processor, memory accessible by the processor, and computer program instructions stored in the memory and executable by the processor to perform: receiving, at the telecommunications switch, a request to initiate a call from an originating party; selecting, at the telecommunications switch, from a list of terminating carrier networks, an evaluation service based on routing; wherein the evaluation service is included in the list of terminating carrier with highest priority and a terminating carrier with which the call is completed is included in the list of terminating carrier as a lower priority; routing, at the telecommunications switch, the request to initiate the call to the evaluation service; forwarding, from the evaluation service, a media prompt requesting the originating party to enter a response to the media prompt; and when the originating party does not enter a correct response to the media prompt, forwarding, from the evaluation service, an indication that the call is forbidden, and blocking the call, at the telecommunications switch, based on the incorrect response to the media prompt.

8. The telecommunications switch of claim 7, further comprising: when the originating party enters a correct response to the media prompt, forwarding, from the evaluation service, an indication that the evaluation service is unavailable to complete the call; selecting, at the telecommunications switch, from the list of terminating carrier networks, a terminating carrier network to complete the call; and routing, at the telecommunications switch, the request to initiate the call to the selected terminating carrier network.

9. The telecommunications switch of claim 8, wherein not entering a correct response comprises entering an incorrect response and not entering any response within a defined timeout.

10. The telecommunications switch of claim 8, wherein the requested response comprises entering at least one digit.

11. The telecommunications switch of claim 10, wherein not entering a correct response comprises at least one of entering at least one incorrect digit, entering an incorrect number of digits, entering an incorrect sequence of digits, and not entering any digit within a defined timeout.

12. The method of claim 7, further comprising: analyzing, at the evaluation service, information relating to the requested call, and forwarding, from the evaluation service, an indication that the call is forbidden even when the originating party does not enter a correct response to the media prompt.

13. A computer program product comprising a non-transitory computer readable storage having program instructions embodied therewith, the program instructions executable by a computer, to cause the computer to perform a method comprising: receiving, at a telecommunications switch, a request to initiate a call from an originating party; selecting, at the telecommunications switch, from a list of terminating carrier networks, an evaluation service based on priority; wherein the evaluation service is included in the list of terminating carrier with highest priority and a terminating carrier with which the call is completed is included in the list of terminating carrier as a lower priority; routing, at the telecommunications switch, the request to initiate the call to the evaluation service; forwarding, from the evaluation service, a media prompt requesting the originating party to enter a response to the media prompt; and when the originating party does not enter a correct response to the media prompt, forwarding, from the evaluation service, an indication that the call is forbidden, and blocking the call, at the telecommunications switch, based on the incorrect response to the media prompt.

14. The computer program product of claim 13, further comprising: when the originating party enters a correct response to the media prompt, forwarding, from the evaluation service, an indication that the evaluation service is unavailable to complete thell; selecting, at the telecommunications switch, from the list of terminating carrier networks, a terminating carrier network to complete the call; and routing, at the telecommunications switch, the request to initiate the call to the selected terminating carrier network.

15. The computer program product of claim 14, wherein not entering a correct response comprises entering an incorrect response and not entering any response within a defined timeout.

16. The computer program product of claim 14, wherein the requested response comprises entering at least one digit.

17. The computer program product of claim 16, wherein not entering a correct response comprises at least one of entering at least one incorrect digit, entering an incorrect number of digits, entering an incorrect sequence of digits, and not entering any digit within a defined timeout.

18. The method of claim 13, further comprising: analyzing, at the evaluation service, information relating to the requested call, and forwarding, from the evaluation service, an indication that the call is forbidden even when the originating party does not enter a correct response to the media prompt.

19. A method, implemented in a computer system comprising a processor, memory accessible by the processor, and computer program instructions stored in the memory and executable by the processor, the method comprising: receiving, at a telecommunications switch, a request to initiate a call from an originating party; selecting, at the telecommunications switch, from a list of terminating carrier networks, an evaluation service based on priority; wherein the evaluation service is included in the list of terminating carrier with highest priority and a terminating carrier with which the call is completed is included in the list of terminating carrier as a lower priority; routing, at the telecommunications switch, the request to initiate the call to the evaluation service; analyzing, at the evaluation service, a media dialog from the originating party to determine whether to allow the call; and when the evaluation service determines not to allow the call, forwarding, from the evaluation service, an indication that the call is forbidden, and blocking the call, at the telecommunications switch, based on the incorrect response to the media prompt.

20. The method of claim 19, further comprising: when the evaluation service determines to allow the call, forwarding, from the evaluation service, an indication that the evaluation service is unavailable to complete the call; selecting, at the telecommunications switch, from the list of terminating carrier networks, a terminating carrier network to complete the call; and routing, at the telecommunications switch, the request to initiate the call to the selected terminating carrier network.

21. The method of claim 20, wherein the evaluation service analyze the media dialog using voice recognition to determine a content of the media dialog and artificial intelligence to determine whether the call is unwanted or illegal, or is wanted or important, based on the determined content.

22. A telecommunications switch comprising a processor, memory accessible by the processor, and computer program instructions stored in the memory and executable by the processor to perform: receiving, at a telecommunications switch, a request to initiate a call from an originating party; selecting, at the telecommunications switch, from a list of terminating carrier networks, an evaluation service based on priority; wherein the evaluation service is included in the list of terminating carrier with highest priority and a terminating carrier with which the call is completed is included in the list of terminating carrier as a lower priority; routing, at the telecommunications switch, the request to initiate the call to the evaluation service; analyzing, at the evaluation service, a media dialog from the originating party to determine whether to allow the call; and when the evaluation service determines not to allow the call, forwarding, from the evaluation service, an indication that the call is forbidden, and blocking the call, at the telecommunications switch, based on the incorrect response to the media prompt.

23. The switch of claim 22, further comprising: when the evaluation service determines to allow the call, forwarding, from the evaluation service, an indication that the evaluation service is unavailable to complete the call; selecting, at the telecommunications switch, from the list of terminating carrier networks, a terminating carrier network to complete the call; and routing, at the telecommunications switch, the request to initiate the call to the selected terminating carrier network.

24. The switch of claim 23, wherein the evaluation service analyze the media dialog using voice recognition to determine a content of the media dialog and artificial intelligence to determine whether the call is unwanted or illegal, or is wanted or important, based on the determined content.

25. A computer program product comprising a non-transitory computer readable storage having program instructions embodied therewith, the program instructions executable by a computer, to cause the computer to perform a method comprising: receiving, at a telecommunications switch, a request to initiate a call from an originating party; selecting, at the telecommunications switch, from a list of terminating carrier networks, an evaluation service based on priority; wherein the evaluation service is included in the list of terminating carrier with highest priority and a terminating carrier with which the call is completed is included in the list of terminating carrier as a lower priority; routing, at the telecommunications switch, the request to initiate the call to the evaluation service; analyzing, at the evaluation service, a media dialog from the originating party to determine whether to allow the call; and when the evaluation service determines not to allow the call, forwarding, from the evaluation service, an indication that the call is forbidden, and blocking the call, at the telecommunications switch, based on the incorrect response to the media prompt.

26. The computer program product of claim 25, further comprising: when the evaluation service determines to allow the call, forwarding, from the evaluation service, an indication that the evaluation service is unavailable to complete the call; selecting, at the telecommunications switch, from the list of terminating carrier networks, a terminating carrier network to complete the call; and routing, at the telecommunications switch, the request to initiate the call to the selected terminating carrier network.

27. The computer program product of claim 26, wherein the evaluation service analyze the media dialog using voice recognition to determine a content of the media dialog and artificial intelligence to determine whether the call is unwanted or illegal, or is wanted or important, based on the determined content.

* * * * *